United States Patent [19]
Kupiec

[11] Patent Number: 5,335,471
[45] Date of Patent: Aug. 9, 1994

[54] COLUMN ENCLOSING KIT

[76] Inventor: Daniel J. Kupiec, 49 Memorial Dr., Feeding Hills, Mass. 01030

[21] Appl. No.: 27,654

[22] Filed: Mar. 8, 1993

[51] Int. Cl.⁵ .......................... E04C 3/30; E04B 1/94
[52] U.S. Cl. ................. 52/727; 52/DIG. 8; 52/28; 248/218.4
[58] Field of Search .............. 52/DIG. 8, 727, 28; 248/218.4

[56] References Cited

U.S. PATENT DOCUMENTS

| | | | |
|---|---|---|---|
| 1,643,955 | 10/1927 | Rank et al. | 52/727 |
| 3,375,620 | 4/1968 | Phillips | 52/28 |
| 4,577,449 | 3/1986 | Celli | 248/218.4 |

*Primary Examiner*—Carl D. Friedman
*Assistant Examiner*—Christopher Todd Kent
*Attorney, Agent, or Firm*—E. Michael Combs

[57] ABSTRACT

A kit including a plurality of spaced parallel collar pairs are mounted about an associated column, wherein the column pairs are of a generally polygonal configuration having a predetermined number of walls, wherein the walls receive an individual cover plate of a plurality of cover plates to provide for securement of the cover plates to the collar pairs. Foot and crown molding is subsequently mounted to the upper and lowermost distal ends respectively of the cover plates to provide for enclosing of the associated column.

4 Claims, 4 Drawing Sheets

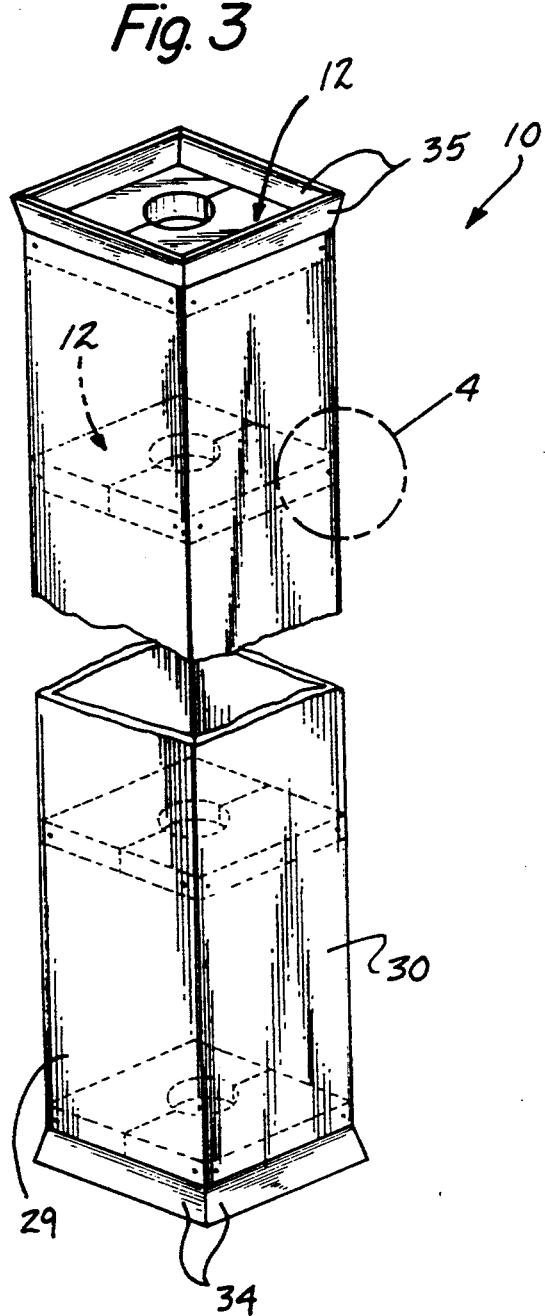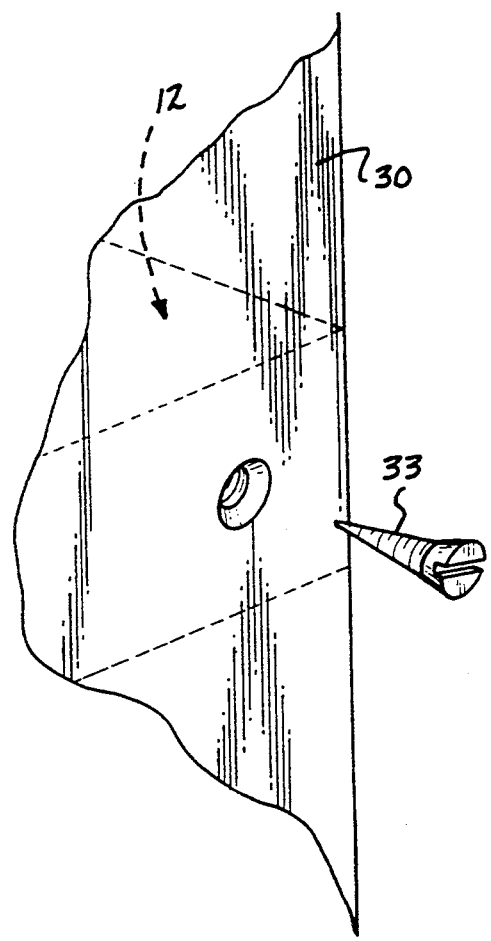

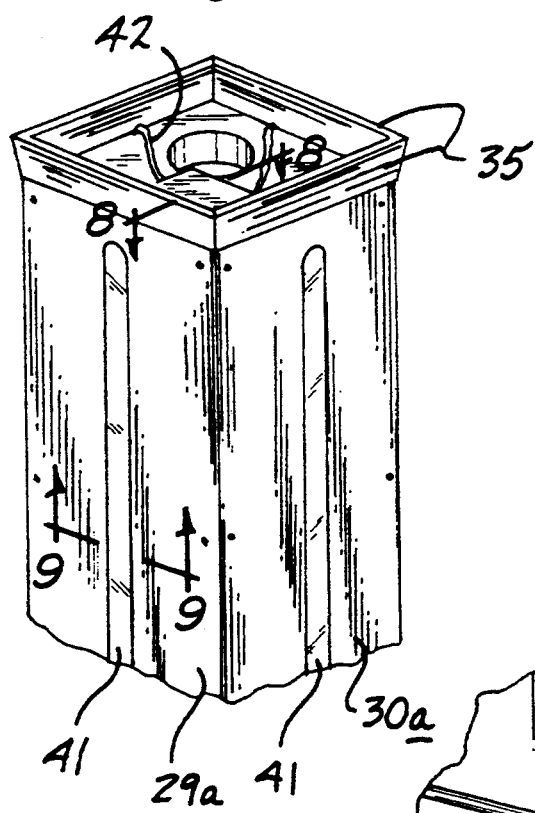
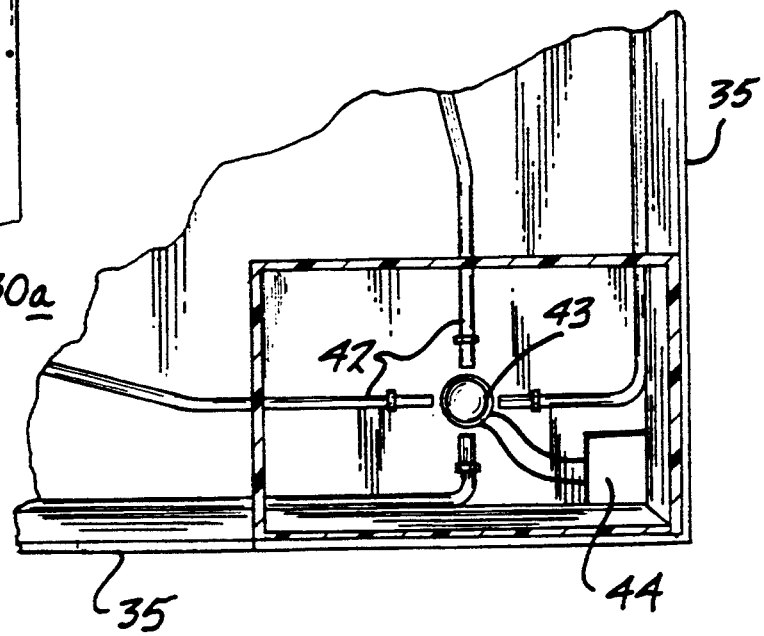
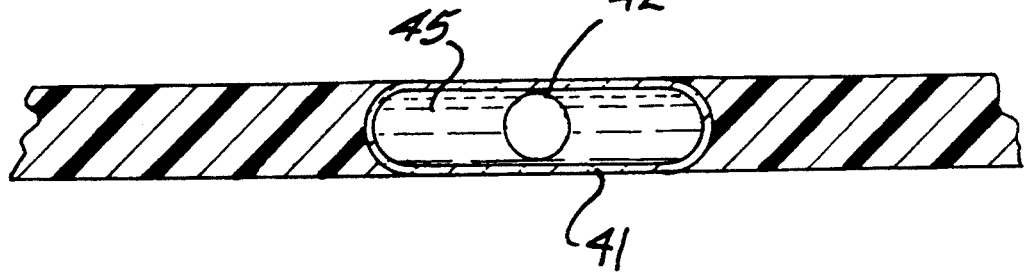

COLUMN ENCLOSING KIT

BACKGROUND OF THE INVENTION

1. Field of the Invention

The field of invention relates to column enclosure structure, and more particularly pertains to a new and improved column enclosing kit arranged to effect enclosure of an associated support column.

2. Description of the Prior Art

The finished covering of columns to provide for the protection, as well as the visual enhancement of such column structure, is available in the prior art and exemplified by U.S. Pat. No. 4,467,584 setting forth the use of a plurality of support plates mounted to corner portions of an associated structure that in turn are secured to a column, wherein U.S. Pat. No. 4,961,258 sets forth the decorative surrounding of a column, as further exemplified in U.S. Pat. No. 3,590,547.

The instant invention attempts to overcome deficiencies of the prior art by providing for a kit structure providing for a plurality of components arranged for ease of use as well as effectiveness in construction in the surrounding of an associated column and in this respect, the present invention substantially fulfills this need.

SUMMARY OF THE INVENTION

In view of the foregoing disadvantages inherent in the known types of column enclosing apparatus now present in the prior art, the present invention provides a column enclosing kit permitting the surrounding enclosure of a column by panel members permitting the securement of the various column members by collars that are secured about an associated column. As such, the general purpose of the present invention, which will be described subsequently in greater detail, is to provide a new and improved column enclosing kit which has all the advantages of the prior art column enclosing apparatus and none of the disadvantages.

To attain this, the present invention provides a kit including a plurality of spaced parallel collar pairs mounted about an associated column, wherein the column pairs are of a generally polygonal configuration having a predetermined number of walls, wherein the walls receive an individual cover plate of a plurality of cover plates to provide for securement of the cover plates to the collar pairs. Foot and crown molding is subsequently mounted to the upper and lowermost distal ends respectively of the cover plates to provide for enclosing of the associated column.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved column enclosing kit which has all the advantages of the prior art column enclosing apparatus and none of the disadvantages.

It is another object of the present invention to provide a new and improved column enclosing kit which may be easily and efficiently manufactured and marketed.

It is a further object of the present invention to provide a new and improved column enclosing kit which is of a durable and reliable construction.

An even further object of the present invention is to provide a new and improved column enclosing kit which is susceptible of a low cost of manufacture with regard to both materials and labor, and which accordingly is then susceptible of low prices of sale to the consuming public, thereby making such column enclosing kits economically available to the buying public.

Still yet another object of the present invention is to provide a new and improved column enclosing kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the invention.

FIG. 4 is an enlarged isometric illustration of section 4 as set forth in FIG. 3.

FIG. 7 is an isometric illustration of a modified cover plate structure.

FIG. 8 is an orthographic view, taken along the lines 8—8 of FIG. 7 in the direction indicated by the arrows.

FIG. 9 is an orthographic view, taken along the lines 9—9 of FIG. 7 in the direction indicated by the arrows.

DESCRIPTION OF THE PREFERRED EMBODIMENT

Figure 1:
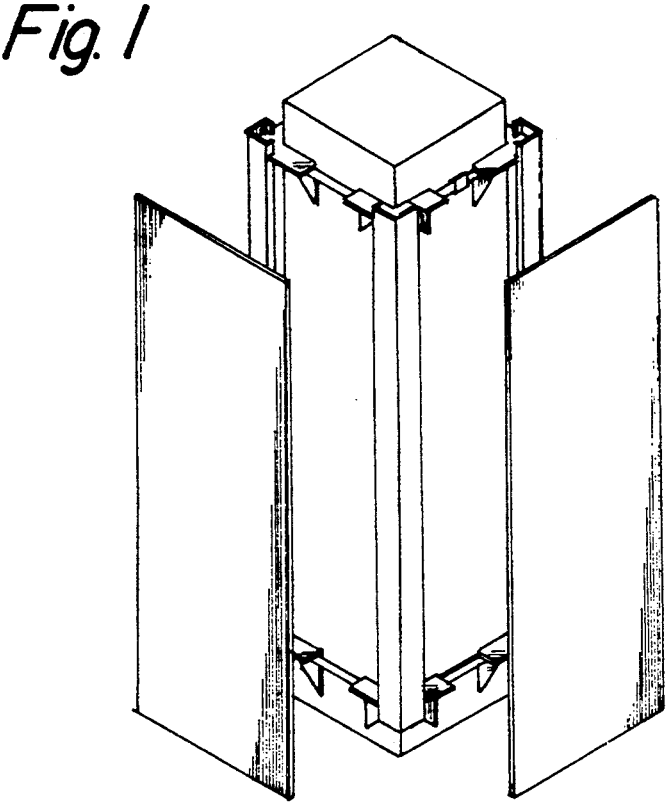
FIG. 1 is an isometric illustration a prior art column enclosing kit, as indicated in U.S. Pat. No. 4,467,584.
Figure 2:
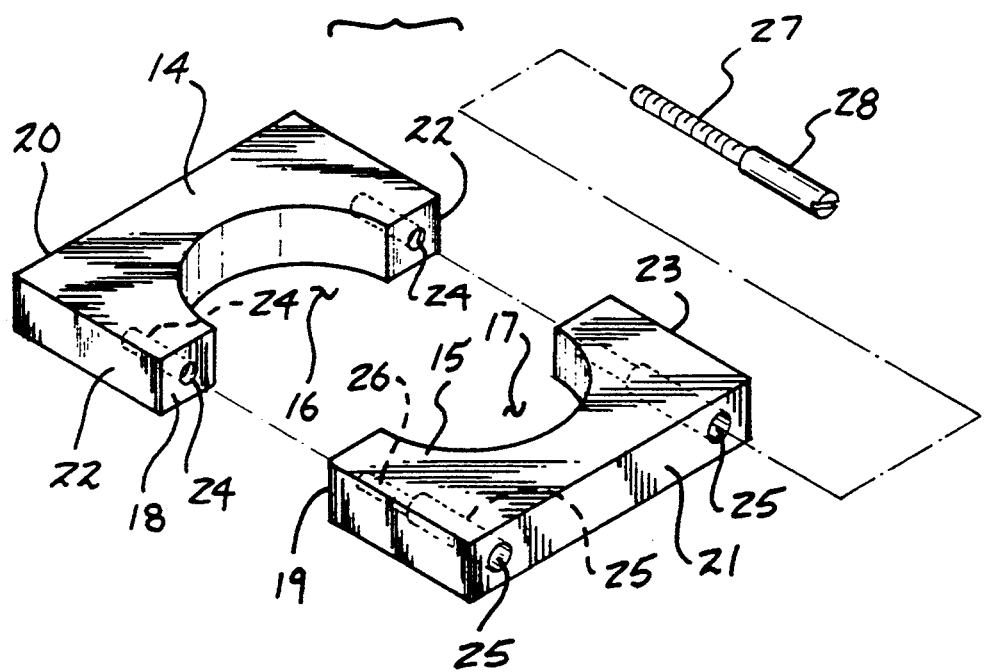
FIG. 2 is an isometic illustration of a collar pair as indicated for use by the invention.

With reference now to the drawings, and in particular to FIGS. 1 to 9 thereof, a new and improved column enclosing kit embodying the principles and concepts of the present invention and generally designated by the reference numeral 10 will be described.

Figure 5:
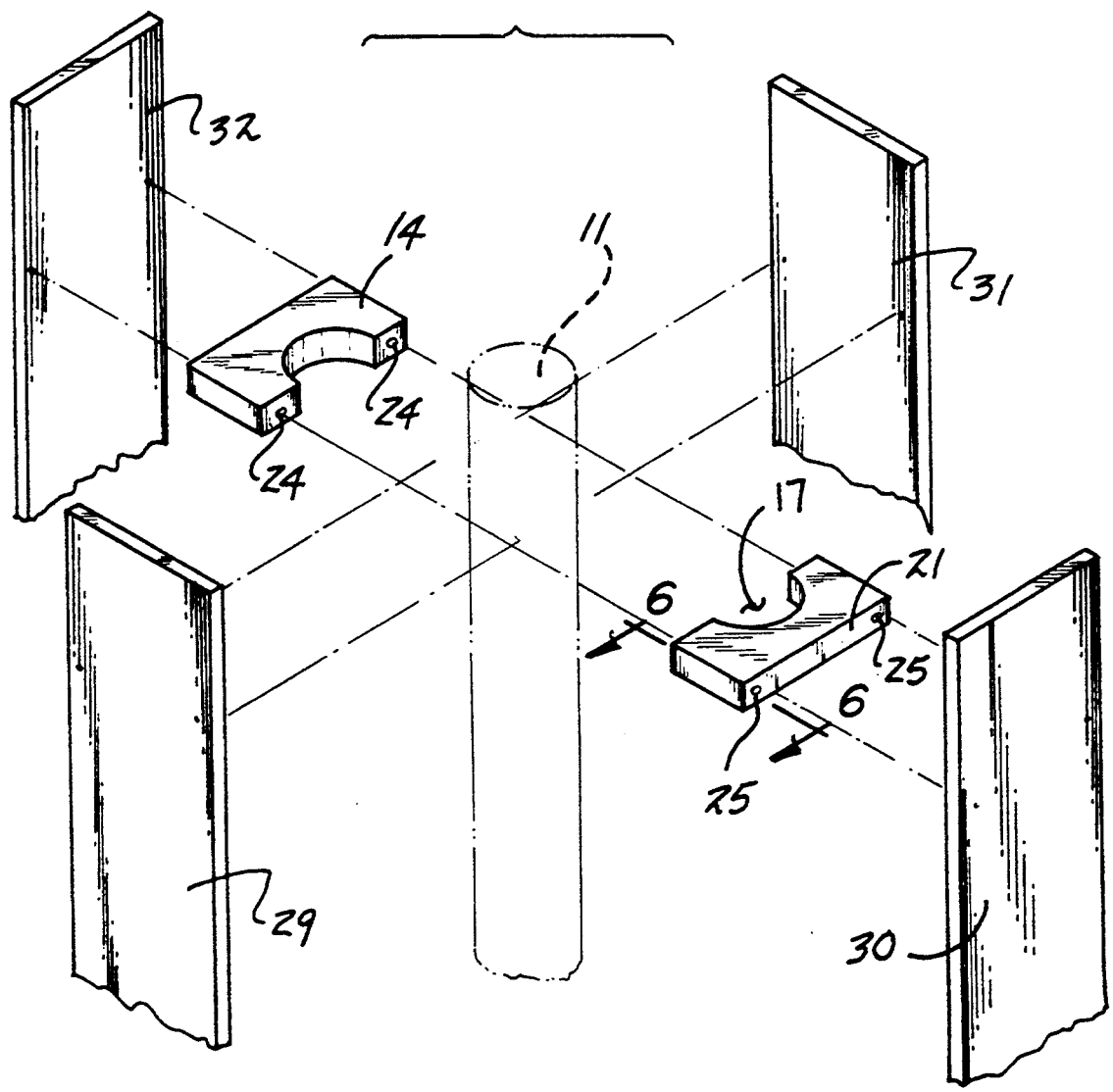
FIG. 5 is an isometric illustration indicating the orientation of the covering plates relative to an individual collar pair of the collar pairs, as indicated in FIG. 3.

More specifically, the column enclosing kit 10, as indicated in FIG. 3, includes a plurality of spaced parallel collar pairs 12 mounted about an associated column 11, such as indicated in FIG. 5. Each collar pair 12 includes a first collar 14 secured to a second collar 15, having respective first and second semi-cylindrical recesses 16 and 17 arranged in a facing relationship relative to one another to receive the column 11. First and second collar front walls 18 and 19 include the respective first and second recesses 16 and 17 directed therein, wherein the first and second front walls are arranged in a coextensive confronting relationship, with respective first and second collar rear walls 20 and 21 arranged in a parallel spaced relationship relative to the respective first and second collar front walls 18 and 19. First collar side walls 22 and second collar side walls 23 are provided. In this manner, the collar pairs when in an assembled configuration, such as indicated in FIG. 3, provide for a predetermined number of walls that are arranged in a parallel relationship relative to an axis of the first and second semi-cylindrical recesses 16 and 17 in an assembled configuration, wherein respective first, second, third, and fourth cover plates 29, 30, 31, and 32 are mounted to an individual wall structure, as the first cover plate 29 is mounted to a respective first and second collar side wall, with the second cover plate 30 mounted to the second collar rear wall, the third cover plate 31 is mounted to an assembled first and second collar side wall, and wherein the fourth cover plate 32 is mounted to the second collar rear wall. In assembling the first and second collars together, the first collar includes a plurality of spaced parallel first threaded bores 24 of a first diameter directed into the first collar front wall 18, with each of the first bores 24 arranged for alignment with a third bore 26 of said first diameter directed into the second collar front wall 19. The third bores 26 are each in communication with a second bore 25 of a second diameter greater than the first diameter. An externally threaded lock rod 27 is received through the first and third bores 24 and 26, while a second bore 25 directed into the second collar through the second collar rear wall 21 receives the lock rod head 28 having a diameter substantially equal to the second diameter. Cover plate fasteners 33 directed through each of the cover plates are received into the collar pair 12, in a manner as indicated in FIG. 4, to secure the cover plates to the collar pairs, wherein foot and crown molding members 34 and 35 are arranged in surrounding relationship relative to the lower and upper respective distal ends of the cover plates when in an assembled configuration.

Figure 6:
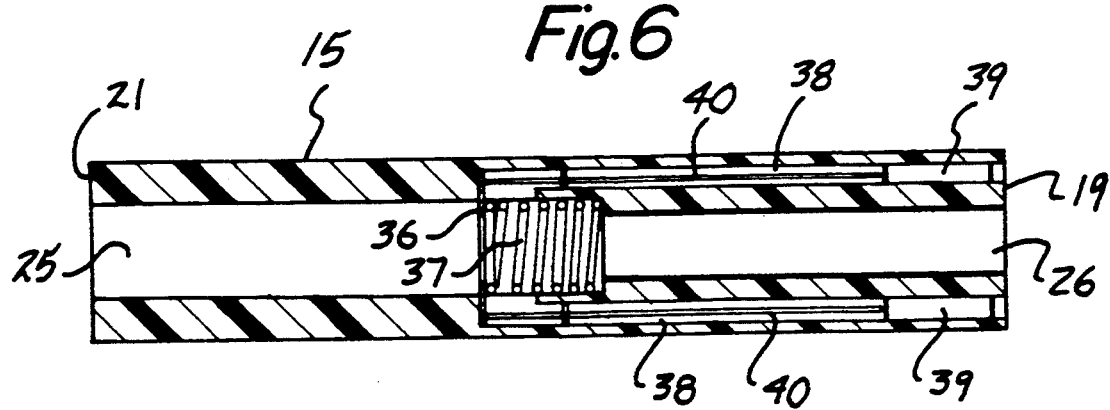
FIG. 6 is an orthographic view, taken along the lines 6—6 of FIG. 5 in the direction indicated by the arrows.

The FIG. 6 indicates the use of the second collar 15 having an apertured abutment plate 36 mounted within the first bore extending beyond the first bore into a plurality of perimeter channels 38, wherein the abutment plate 36 central bore is of a diameter substantially equal to the first diameter to receive the lock rod 27 therethrough. A coil spring 37 is captured between the abutment plate 36 and an annular floor at an interface of the second and third bores 25 and 26. Each of the perimeter channels 38 includes a glue capsule 39 having fluid adhesive contained therewithin, wherein a puncture pin 40 is positioned within each of the perimeter channels 38 oriented between a glue capsule 39 and the abutment plate 36, whereupon the lock rod head 28 abutting the abutment plate 36 within the second bore 25, the spring 37 is compressed projecting the puncture pins 40 into the glue capsules 39 that subsequently direct the glue exteriorly of the channels 38 for enhanced adherence of the collar pairs to the column 11.

Further, an optional use of modified cover plates 29a and 30a is indicated, wherein the cover plates are each arranged to include a longitudinal transparent window 40 having a cylindrical illumination tube 42 directed therethrough surrounded by a translucent fluid 45 of a predetermined coloration. Each of the illumination tubes 42 are directed from the transparent window 41 to illumination bulb 43 arranged for selective illumination through a battery pack 44 that may alternatively be an electrical junction for electrical communication to household current. In this manner, illumination is directed through the tubes for illumination of the tubes within the panels in adjacency to the transparent windows for decorative enhancement of the panels when in an assembled configuration, such as indicated in FIG. 7.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A column enclosing kit, comprising,
   a plurality of collar pairs arranged for securement about a column member in a spaced parallel relationship, wherein each of the collar pairs includes a first collar and a second collar, and
   the first collar and the second collar include respective first and second confronting mirror image semi-cylindrical recesses arranged to receive the column member therewithin, the first collar and the second collar having respective first and second collar front walls arranged for facing contiguous communication relative to one another, with the first collar front wall including the first semi-cylindrical recess directed therewithin, and the second collar front wall having the second semi-cylindrical recess directed therewithin, and the first and second collars having first and second collar rear walls, and first and second collar side walls, and a first cover plate arranged for mounting to one of the first and second collar side walls, and a third cover plate arranged for securement to a further one of the first and second collar side walls, and a second cover plate arranged for securement to the second collar rear wall, and a fourth cover plate arranged for securement to the first collar rear wall, and cover plate fasteners directed through the first, second, third, and fourth cover plates into the first and second collars.

2. A column enclosing kit as set forth in claim 1 wherein the first collar includes a plurality of spaced parallel first threaded bores directed into the first collar front wall, and a plurality of spaced parallel second bores directed into the second collar rear wall, and third bores in communication with the second bores extending from the second bores through the first collar front wall, wherein an externally threaded lock rod is received within one of the third bores and first bores, wherein the first bores and third bores are of an equal first diameter, and the second bores are of a second diameter greater than the first diameter, and the lock rod includes a lock rod head received within the second bore in a complementary relationship.

3. A column enclosing kit as set forth in claim 2 wherein an apertured abutment plate having a central bore substantially equal to the first diameter is positioned within the third bore, and including a coil spring positioned between the abutment plate and the third bore, wherein the abutment plate is in communication with a plurality of perimeter channels extending from the abutment plate through the second collar front wall, and each of the channels includes a glue capsule having a fluid adhesive contained therewithin, and a puncture pin oriented between the glue capsule and the abutment plate, whereupon projection of the apertured abutment plate towards the third bore is effected upon directing the lock rod head through the second bore.

4. A column enclosing kit as set forth in claim 3 wherein at least one cover plate of said first, second, third, and fourth cover plates includes an elongate transparent window tube, the window tube including a translucent fluid, and the window tube including a cylindrical illumination tube directed into the window tube, and the illumination tube directed from the window tube into adjacency relative to an illumination bulb, with the illumination bulb mounted onto one of said collar pairs, and the illumination bulb arranged to direct illumination through the illumination tube into the window tube to effect illumination of the illumination tube and the translucent fluid.

* * * * *